United States Patent [19]

Buriks et al.

[11] 4,259,464
[45] Mar. 31, 1981

[54] CYCLIC PHENOL-ALDEHYDE RESINS

[75] Inventors: Rudolf S. Buriks; Allen R. Fauke, both of St. Louis; John H. Munch, Kirkwood, all of Mo.

[73] Assignee: Petrolite Corporation, St. Louis, Mo.

[21] Appl. No.: 686,096

[22] Filed: May 13, 1976

Related U.S. Application Data

[63] Continuation-in-part of Ser. No. 172,869, Aug. 18, 1971, abandoned.

[51] Int. Cl.$^3$ .................. C08G 8/12; C08G 8/28; C08G 8/36; C08G 8/32
[52] U.S. Cl. .................. 525/480; 525/502; 525/504; 525/505; 525/507; 525/508; 528/144; 528/148; 528/151; 528/152; 528/153; 528/154; 528/165
[58] Field of Search ............ 260/51 R, 53 HA, 53 R, 260/59 R; 528/144, 147, 148, 151, 152, 153, 154, 165; 525/480, 504, 505, 507, 508, 502

[56] References Cited

U.S. PATENT DOCUMENTS

| 2,499,365 | 3/1950 | DeGroote et al. | 252/338 |
| 2,647,873 | 8/1953 | Matthews et al. | 260/53 X |

OTHER PUBLICATIONS

Phenolic Resins, Whitehouse et al., 1970, pp. 119–143.
Martin, The Chemistry of Phenolic Resins, pp. 87–88, 1956.
Patrick et al., J. Org. Chem., vol. 42, pp. 382–383 (1977).
Cornforth et al., Brit. J. Pharmacol., vol. 10, pp. 73–86, (1955).
Zinke, J. Appl. Chem., Jun. 1951, pp. 257–266.
Megson, Phenolic Resin Chemistry, 1958, pp. 41, 48–50, 56, 57, 198, 246 and 303.

*Primary Examiner*—Howard E. Schain
*Attorney, Agent, or Firm*—Sidney B. Ring; Hyman F. Glass

[57] ABSTRACT

Cyclic phenol-aldehyde resins, for example cyclic tetramers; derivatives thereof; processes by which they are prepared; and uses thereof.

19 Claims, No Drawings

CYCLIC PHENOL-ALDEHYDE RESINS

This application is a continuation-in-part of application Ser. No. 172,869, filed Aug. 18, 1971, now abandoned.

Although linear phenol-aldehyde resins are well known, for example, as disclosed in U.S. Pat. No. 2,499,365; where cyclic phenol-aldehyde resins have been prepared they were produced in low yields in the nature of by-products of linear resins.

We have now discovered that cyclic phenol-aldehyde resins can be prepared in high yields. For example, the cyclic tetramers can be prepared in high yields, as the main products, often in excess of 90%.

Linear phenol-aldehyde resins may be depicted by the formula

where $\phi$ is the phenolic group and A is the bridging group derived from an aldehyde. In the cyclic phenol-aldehyde resin the end valences are joined to form a cyclic structure, for example,

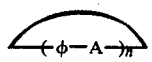

where the circular line indicates a cyclic structure where n is, for example, 4-16 or greater. The preferred structure is the cyclic tetramer where n=4

These cyclic resins are in general infusible and relatively solvent insoluble. By the term "relatively solvent insoluble", we mean that these materials show considerably less solubility in common organic solvents than the corresponding linear counterparts. The cyclic resins derived from a substituted phenol and an aldehyde are, for example, insoluble, or slightly soluble, in paraffinic hydrocarbons, ketones, esters, alcohols, water, dimethylformamide, etc. They show greater solubility in aromatic solvents and certain halogenated solvents, i.e., chloroform, and fair to good solubility in certain basic nitrogen solvents, i.e., pyridine, piperazine, etc. These solubility characteristics may be affected by changes in the bridge between the phenolic nuclei and/or by the substitution on the phenolic nucleus. Thus, for example, a long chain substitution will make the cyclic resins more hydrocarbon soluble than the corresponding short chain substituted material.

The peculiar effect of structure on melting point can be clearly appreciated by the following table which lists the melting points for the crystalline form of the compounds I:

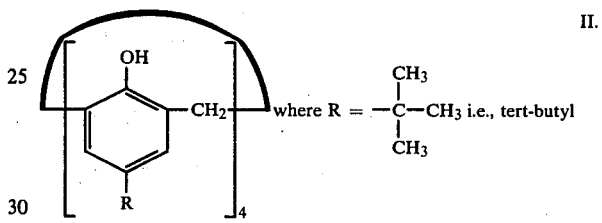

R = tert.-butyl

| | m.p. |
|---|---|
| n = 0 | 160° C. |
| 1 | 217 |
| 2 | 206 |
| 3 | 200 |
| 4 | 250 |
| 5 | 247 |
| 6 | 255 |

In comparison the cyclic tetramer of general structure II:

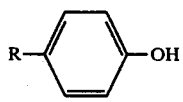

has a melting point above 360° C., the limit of the melting point apparatus.

In general, we classify those resins melting above 300° C. as being infusible. These compounds generally decompose before melting.

The terms "relatively insoluble" and "infusible" as applied herein differentiate between the cyclic resins of this invention and their linear counterparts. Structurally the cyclic resin has one bridging group for each phenolic unit, whereas the linear analogues have one less bridging group than phenolic units and the cross-linked phenol-formaldehyde resin has more than one bridging group per phenolic unit.

Other examples of high melting infusible resins of structure II are those with the following groups:

| | |
|---|---|
| R=t-octyl | MP above 300° C. dec. |
| R=phenyl | MP above 360° C. dec. |
| R—cyclohexyl | MP above 360° C. dec. |
| R—benzyl | MP above 360° C. dec. |
| R—t-amyl | MP above 360° C. dec. |
| R—t-hexyl | MP above 360° C. dec. |

The nature of the products formed from a phenolic compound and a carbonyl compound varies greatly depending on the method and conditions of reaction. Thus, if a phenol compound of the type:

is reacted with an aldehyde, for example paraformaldehyde, under acidic conditions, the linear resin is formed almost exclusively. Under neutral conditions little or no reaction takes place. Under strongly basic conditions some cyclic tetramer is formed, but the formation of a linear product is strongly favored. Under mildly basic conditions substantial amounts of the cyclic tetramer can be found in the resinous products. By means of the process described herein we have discovered a process of preparing cyclic resins in high yields, in certain instances approaching quantitative yields; thus, our process results in the almost exclusive formation of these infusible, relatively solvent insoluble cyclic tetramers in near quantitative yields by a simple one-step procedure.

In order to achieve higher yields of the cyclic tetramer, in addition to having mild basicity, it is desirable not only to carry out the condensation in a relatively non-polar solvent, but also to carry out the reaction at a slower rate than employed in forming the linear resin. Even by using proper basicity, a low yield of cyclic compound may result under the wrong conditions. Thus, by employing 37% aqueous formaldehyde, a poor yield of the desired cyclic tetramer is obtained, whereas a high yield is obtained by using paraformaldehyde in a non-polar solvent such as xylene.

Since reaction between an aldehyde and a p-alkylphenol takes place on the ortho position, ortho-phenolic-aldehyde preformed reaction products can be employed as partial or complete replacements for the aldehyde and/or the phenolic compound. Furthermore, functionally equivalent derivatives of the orthomethylol phenols may be used, i.e., the chloromethyl phenols, the acetoxy methyl phenols, etc.

By the use of preformed phenolic compounds of the formula:

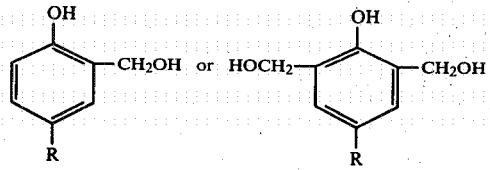

it is possible to form cyclic compounds with —CH$_2$— and/or —CH$_2$OCH$_2$— bridges depending upon the reaction conditions. When the methylol phenol compound is condensed under essentially neutral conditions using sufficiently high temperature to eliminate water, but no so high as to cause elimination of formaldehyde, a cyclic resin is obtained having 4–8 phenolic units (almost exclusively an even number of units rather than odd) bridged by ether-containing linkages —CH$_2$OCH$_2$—. However, since it is practically impossible to entirely exclude the elimination of formaldehyde some of the bridging will be by means of methylene groups —CH$_2$—.

When an ortho-dimethylol phenol compound is condensed under mildly basic conditions, cyclic resins are formed containing methylene bridges as described above. Formaldehyde is eliminated during this reaction. In addition, if the monomethylol phenol compound is used, the same cyclic resin is formed; however, in much lower yield.

Cyclic resins may be formed containing different phenolic units by a number of different procedures. Thus a mixture of, for example, para-tertiary amylphenol and para-tertiary butylphenol may be condensed with formaldehyde to give cyclic resins containing a mixture of phenolic units in each tetramer. By the use of this procedure it is best to use phenols having in general the same reactivity towards formaldehyde. When phenols of different reactivity are used, it is best to use different procedures involving the use of preformed phenol-aldehyde condensates as described above.

There should be present in the reaction mixture, at least 1.0 moles of carbonyl compound (combined or uncombined) per mole phenol having two active positions. The carbonyl-phenolic reaction can take place in situ or may be preformed prior to reaction. If the required moles of carbonyl compound are present in the preformed compound, no further carbonyl compound need be added.

Since the carbonyl compound reacts with hydrogens on free positions of the phenolic ring, water is produced during the course of the reaction, using formaldehyde and a para-substituted phenol according to the general formula:

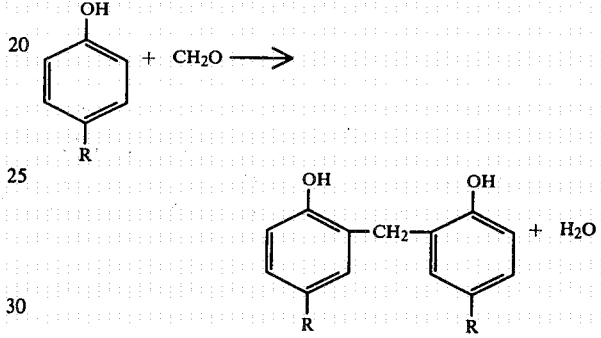

Thus water removal is necessary to complete the reaction and the amount of water removed indicates reaction completion. By removing water the equilibrium is shifted in favor of further condensation. The solvent employed can also be used as an azeotroping agent to aid in this water removal.

The following illustrates a general procedure for preparing the cyclic resins of this invention.

GENERAL PROCEDURE

In a resin pot, equipped with stirrer, thermometer and Dean-Stark trap with reflux condenser are placed the p-alkyl phenol, paraformaldehyde and solvent. (The solvent amounts approximately to 60% of the total reaction mixture.) The mixture is heated to 50° C. with stirring, which is continued throughout the reaction.

Then a catalytic amount of 50% aqueous sodium hydroxide (1.0 to 3.0 mole % based on the phenol) is added and the mixture slowly heated to 90° C., where it is held for 30 minutes, after which period it is usually clear and completely homogeneous. The mixture is then heated to reflux and kept at reflux for four hours, at which time all the water (and excess formaldehyde) has distilled. After cooling, the product is analyzed. Quite often this can be done by first removing the crystalline cyclic tetramer, which usually is quite insoluble, by suction filtration, followed by removal of the solvent from the filtrate in vacuo on a steam bath, to leave the linear condensation resin behind.

Many series of reactions were run according to the above procedure. All data so obtained strongly indicate that during the initial stages of the reaction, when the mixture is heated to 90° C. before the water removal, mono- and dimethylol derivatives of the alkylphenol are formed in situ as reaction intermediates. These intermediates then during the subsequent reaction course condense with the elimination of water (and formaldehyde) to yield the desired product.

We have discovered that an important variable determining the yield of cyclic tetramer in this reaction is the molar ratio of phenol to formaldehyde in the starting mixture. The following table demonstrates this discovery on a series of examples carried out with para-tertiary-butyl phenol and formaldehyde according to the general procedure.

TABLE I

| Ex. | Moles of p-t-butyl phenol | Moles of CH$_2$O | Moles of NaOH | ml of xylene | Yield of tetramer |
|---|---|---|---|---|---|
| 1 | 0.1000 | 0.100 | 0.002 | 50 | 45.4% |
| 2 | 0.1000 | 0.120 | 0.002 | 50 | 55.9% |
| 3 | 0.1000 | 0.150 | 0.002 | 50 | 74.8% |
| 4 | 0.1000 | 0.200 | 0.002 | 50 | 92.9% |

The percentage yield of cyclic tetramer (based on the amount of phenol used) clearly indicates the direct dependence of yield on the amount of formaldehyde used, with a quantitative yield approached at the 1:2 molar phenol/formaldehyde ratio.

Mono-methylol and dimethylol derivatives of p-tert.-butyl phenol were prepared and subsequently dissolved in xylene and condensed, after addition of base, under conditions comparable to those used in the general procedure, i.e., starting with p-tert.-butyl phenol and formaldehyde. The following are exemplary.

EXAMPLE A

Preparation of 5-t-butyl-2-hydroxybenzyl alcohol

In a 1-liter Erlenmeyer flask 150 g (1.00 mole) of p-t-butylphenol, 56 g (1.4 formulas) of sodium hydroxide dissolved in 400 ml of water, and 120 ml (1.6 moles, 40 g CH$_2$O/100 ml solution) of formaldehyde solution were combined. The mixture was kept at 50° in a water bath for 5 days with occasional swirling. (After 10 minutes the mixture had become a nearly clear solution, but cloudiness began to increase after an additional 5 minutes.) The precipitated solid product was suction filtered, washed with a little water, and sucked as dry as possible. This still moist salt was neutralized by treatment with about 600 ml of 10% acetic acid. The new solid which formed was filtered and washed with water to give 107.9 g, m.p. 65°–85°. Two recrystallizations from hexane with a small amount of ether added yielded 90.1 g (50%) of 5-t-butyl-2-hydroxybenzyl alcohol m.p. of 91°–92°. The NMR spectrum of this compound (3.1$\tau$, multiplet, 3 protons, aromatic; 6.1, broad singlet, 2, OH; 5.42, singlet, 2,CH$_2$; 8.80, singlet, 9, C(CH$_3$)$_3$) is interesting in that the two nonequivalent hydroxyls appear to give only one peak. This is probably caused by time averaging of the two hydroxy protons due to hydrogen bonding and the acidity of the phenolic proton.

EXAMPLE B

Preparation of 4-t-butyl-2,6-bis(hydroxymethyl) phenol

In a 1-liter Erlenmeyer flask were combined 75 g (0.50 mole) of p-t-butylphenol, 20 g (0.5 formula) of sodium hydroxide dissolved in 200 ml of water, and 94 ml (1.25 formulas CH$_2$O) of formalin solution (40 g CH$_2$O/100 ml). After sitting six days at room temperature, the solution had produced a heavy precipitate. This salt was suction filtered and washed with saturated aqueous sodium chloride solution. Addition of about 200 ml of saturated aqueous sodium chloride solution to the filtrate produced a second crop of solid, which also was suction filtered. Dissolving each of these crops of moist solid in about 400 ml of warm water, followed by neutralization with 10% aqueous acetic acid produced oils which crystallized on cooling. Suction filtration, washing with water, and drying gave 39 g, m.p. 70°–75°, from the first crop of salt and 46 g, m.p. 68°–73°, from the second crop (total crude yield 77%). Recrystallization of the first crop material from ether-hexane gave 7.5 g, m.p. 74°–76°; 21.3 g, m.p. 74°–76°; 7.6 g, m.p. 72°–74°; and 2.0 g, m.p. 70°–74° (some difficulty with oiling out). Recrystallization of the second crop material from carbon tetrachloride gave 21 g, m.p. 71°–74°, and another crop of 5.9 g, m.p. 70°–74°. Final yield 41.1 g (39%), m.p. 73°–75°.

In a second run exactly the same procedure was used, but all quantities were doubled. Again two crops of product salt were collected, which after neutralization gave 75 g, m.p. 74°–75°, and 89 g, m.p. 68°–73° (78% crude yield). Recrystallization (CCl$_4$) gave 115 g (55%), m.p. 74°–75°.

Condensation reactions of p-t-butyl phenol and its hydroxymethyl substituted derivatives The procedure used was the same as that used in Table I. The reactions were carried out in 50 ml of xylene using 0.002 moles of NaOH catalyst per 0.100 mole of mono- or dimethylol derivative.

TABLE II

| Ex. | Phenol | Yield of cyclic tetramer |
|---|---|---|
| 1 | 4-t-butyl-2,6-bis (hydroxy methyl) phenol | 85.2% |
| 2 | " | 86.4% |
| 3 | 5-t-butyl-2-hydroxy benzyl alcohol | 55.1% |
| 4 | " | 53.2% |

These data again show clearly that in those reactions where the (in this case precondensed) formaldehyde is present in a molar excess to the alkyl phenol the yield of desired tetramer is substantially higher than under conditions where this molar ratio is unity.

The above examples and general procedure illustrate the preferred conditions for the preparation of these cyclic tetrameric alkylphenol-formaldehyde condensates. Considering the preparation either directly from the alkylphenols and aldehydes or from the preformed methylol phenols the following points are noted:

(1) The temperature range is between about 80° C. to 250° C. with the preferred range being about 135° C.–185° C.;

(2) The reaction time depends on the temperature and the catalyst, for example, as long as about 200 hours or longer or as short as about 2 hours or shorter.

(3) The catalyst may be strong alkali or an alkali salt of a weak acid, such as sodium acetate and the mole % of catalyst can be as high as about 10%, or as low as 0.001%, preferably with NaOH in the range of 1.0 to 3.0 mole percent, based on the starting phenol.

(4) Any non-reacting non-polar solvent can be used, for example hydrocarbon solvents such as benzene, xylene, trimethyl benzene, dodecyl benzene, high-boiling petroleum solvent, etc., with the preferred ones being xylene and trimethyl benzene.

(5) It is desirable to provide sufficient stirring, for example with an anchor-type stirrer being preferred to a turbine-type stirrer.

(6) The preferred molar ratio of aldehyde to phenol is 2.5:1 to 1:1 with a preferred ratio of 2:1.

(7) Non-polar conditions are employed and it is desirable to avoid the use, as much as possible, of hydroxylic components. Thus the use of paraformaldehyde is preferred over aqueous (i.e., 37%) formaldehyde. A wide variety of other aldehydes can also be used.

The following table presents a wide variety of resins that can be prepared according to the procedure of this invention. The following compounds employed in preparing cyclic tetrameric alkylphenol-aldehyde resins are designated by the numbers indicated for each phenolic compound.

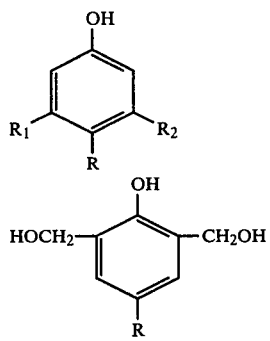
(1)

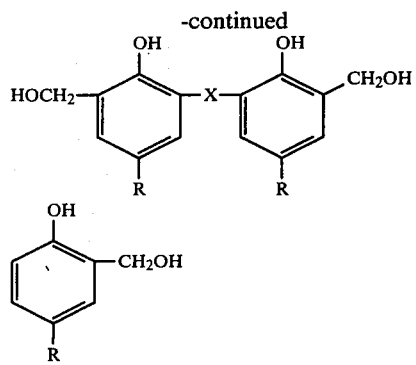

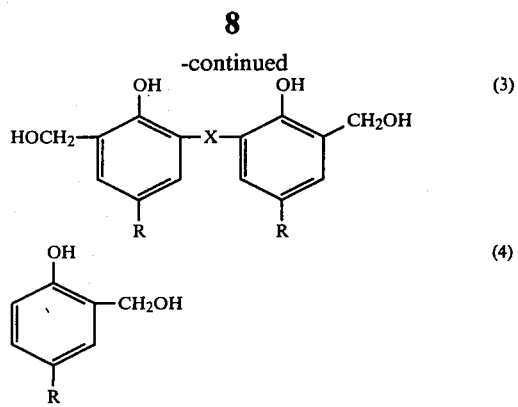

R, $R_1$, and $R_2$ in the Table indicate the specific substituents on these compounds. Where more than one phenolic compound is reacted, the molar ratio of the phenolic compounds inter se is indicated. For example, in Example 31 tert-butyl(2) and nonyl(1) means that a ratio of 2 moles of tert-butyl phenol per mole of nonyl phenol is employed in preparing the resin.

TABLE III

| Ex. | Cpd. | R | $R_1$ | $R_2$ | Aldehyde |
|---|---|---|---|---|---|
| 1 | 1 | methyl | H | H | para formaldehyde |
| 2 | 1 | ethyl | H | H | " |
| 3 | 1 | isopropyl | H | H | " |
| 4 | 1 | sec.butyl | H | H | " |
| 5 | 1 | tert butyl | H | H | " |
| 6 | 1 | tert amyl | H | H | " |
| 7 | 1 | cyclohexyl | H | H | " |
| 8 | 1 | tert hexyl | H | H | " |
| 9 | 1 | octyl | H | H | " |
| 10 | 1 | tert octyl | H | H | " |
| 11 | 1 | nonyl | H | H | " |
| 12 | 1 | dodecyl | H | H | " |
| 13 | 1 | phenyl | H | H | " |
| 14 | 1 | benzyl | H | H | " |
| 15 | 1 | butenyl | H | H | " |
| 16 | 1 | styryl | H | H | " |
| 17 | 1 | chloro | H | H | " |
| 18 | 1 | methyl | methyl | H | " |
| 19 | 1 | methyl | ethyl | H | " |
| 20 | 1 | methyl | propyl | H | " |
| 21 | 1 | methyl | methyl | methyl | " |
| 22 | 1 | tert butyl | H | H | furfural |
| 23 | 1 | nonyl | H | H | " |
| 24 | 1 | tert octyl | H | H | " |
| 25 | 1 | octyl | H | H | acetaldehyde |
| 26 | 1 | tert butyl | H | H | benzaldehyde |
| 27 | 1 | phenyl | H | H | " |
| 28 | 1 | methyl | H | H | " |
| 29 | 1 | cyclohexyl | H | H | " |
| 30 | 1 | nonyl | H | H | " |
| 31 | 1 | tert butyl(2) | H | H | para formaldehyde |
|  | 1 | nonyl(1) | H | H |  |
| 32 | 1 | tert butyl(1) | H | H | " |
|  | 1 | tert octyl(1) | H | H |  |
| 33 | 1 | tert butyl(3) | H | H | " |
|  | 1 | tert octyl(1) | H | H |  |
| 34 | 1 | tert butyl(1) | H | H | " |
|  | 1 | tert amyl(1) | H | H |  |
| 35 | 1 | benzyl(1) | H | H | " |
|  | 1 | cyclohexyl(1) | H | H |  |
| 36 | 2 | tert butyl | — | — | none |
| 37 | 1 | tert butyl(1) | H | H | none |
|  | 2 | tert butyl(1) | — | — |  |
| 38 | 2 | tert butyl(1) | — | — | none |
|  | 1 | nonyl(1) | H | H |  |
| 39 | 2 | methyl(1) | — | — | none |

TABLE III-continued

| Ex. | Cpd. | R | $R_1$ | $R_2$ | Aldehyde |
|---|---|---|---|---|---|
|  | 1 | octyl(1) | H | H |  |
| 40 | 4 | tert butyl | — | — | none |
| 41 | 4 | tert butyl(1) | — | — | para formaldehyde |
|  | 1 | tert butyl(1) | H | H |  |
| 42 | 3 | isopropyl | $X=CH_2-O-CH_2$ | — | none |
| 43 | 3 | tert butyl | $X=CH_2-O-CH_6$ | — | " |
| 44 | 3 | methyl | $X=CH_2$ | — | " |
| 45 | 3 | tert butyl | $X=C\begin{smallmatrix}CH_3\\|\\|\\CH_3\end{smallmatrix}$ | — | " |

To further illustrate reactions of the type listed in the above Table, the following examples describe similar preparations in more detail.

EXAMPLE 46

Reaction of

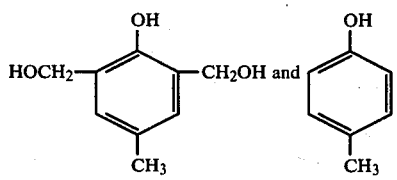

is carried out by reacting at reflux 16.8 grams (0.1 moles) 2,6-dimethylol-4-methylphenol, 10.8 grams (0.1 mole) paracresol, and 0.5 grams anhydrous sodium acetate in 175 ml. xylene. The water produced is continuously removed from the reaction zone by azeotropic distillation into a Dean Stark trap. The course of the reaction is followed by periodic testing for free methylol phenol with methanolic ferric chloride. After all the methylol phenol has been consumed (57 hours) the reaction mixture is cooled, the colorless precipitate collected on a filter, washed with 95% ethanol and air-dried to give 16.6 g (69.5% of theory). The colorless powder does not melt below 350° C., is soluble in pyridine, less so in chloroform or chlorobenzene and slightly soluble to insoluble in hydrocarbon solvents, alcohols, ketones, etc. Its infrared spectrum shows no free ortho positions, no methylol groups, and only methylene bridges between the phenolic nuclei.

EXAMPLE 47

Reaction between p-t-amyl phenol and para formaldehyde

200 Grams (1.22 moles) of para-tertiary amylphenol are dissolved in 400 ml. xylene. To the solution 1 gram (0.025 moles) of NaOH and 48.2 grams (1.45 moles) of 91% paraformaldehyde are added. The mixture is heated slowly to reflux (110° C.) at which temperature water begins to distill. After refluxing for 125 minutes the temperature reaches 150° C. and solids begin to appear in the reaction mixture and the amount of solids increases as reflux continues. After 17 hours of reflux, the theoretical amount of water has been collected and no more methylol groups can be detected by the methanolic-FeCl$_3$ test. The mixture is then allowed to cool down slowly to room temperature overnight. The white microcrystalline solid product weighs 136.4 grams after filtration, isopropanol washing and drying. The yield is 63% of theory.

The product is insoluble in methanol, ethanol, isopropanol, mineral spirits and hexane, practically insoluble in benzene, xylene and acetone. It does not melt below 350° C. Its infrared spectrogram shows no methylol group, no benzyl ether bridge, and no adjacent free hydrogens on the aromatic ring.

EXAMPLE 48

Sodium hydroxide catalyzed reaction of 5-t-butyl-2-hydroxy benzyl alcohol

In a 100 ml round-bottom flask equipped with a magnetic stirrer and Dean-Stark trap with reflux condenser were placed 10.0 g (0.100 moles) of 5-t-butyl-2-hydroxy benzyl alcohol, 40 ml of toluene and 0.25 g (0.003 formula) of 50% aqueous sodium hydroxide. The mixture was heated at reflux for 24 hours, after which time 1.95 ml of water had been collected. After cooling, filtration gave 7.57 g (46.7%) of white, crystalline cyclic tetramer.

EXAMPLE 49

Reaction between p-t-butyl phenol and para formaldehyde

A reactor was charged with 24.5 lbs. of para-tert-butyl phenol, 6 lbs. of para formaldehyde and 57.25 lbs. of xylene. The above charge was heated to 50° C. and 0.213 lbs. of 50% aqueous sodium hydroxide was added. The product was now heated to 90° C. and held there for 0.5 hour, then heated to reflux. Reflux began at 135° C. and gradually increased to 145° C. under azeotropic conditions to remove 4.0 lbs. aqueous layer and 2.25 lbs. solvent. Total time at reflux was 4½ hours. After cooling to 60° C. the product was dropped. Some solid stayed behind because it had caked out on the coils. Analysis of the material so obtained indicated 77-80% yield of the desired cyclic tetramer.

The foregoing examples have illustrated the production of suitable resins from difunctional phenols and aldehydes. Nonlimiting examples include: p-cresol; p-ethyl-phenol; 3-methyl-4-ethyl-phenol; 3-methyl-4-propyl-phenol; p-propyl-phenol; p-tertiary-butyl-phenol; p-secondary-butyl-phenol; p-tertiaryamyl-phenol; p-secondary-amyl-phenol; p-tertiary-hexyl-phenol; p-isoctyl-phenol; p-phenyl-phenol; thymol; p-benzyl-phenol; p-cyclohexyl-phenol; p-tertiary-decyl-phenol; p-dodecyl-phenol; p-tetradecyl-phenol; p-octadecyl-phenol; p-nonyl-phenol; p-heptyl-phenol; p-eicosanyl-phenol; p-docosanyl-phenol; p-tetracosanyl-phenol; p-beta-naphthyl-phenol; p-alpha-naphthylphenol; p-pentadecyl-phenol; those of the formula

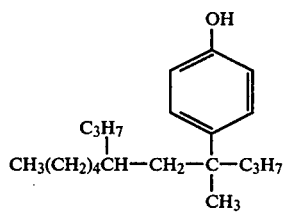

p-tertiary-alkyl-phenols of the formula

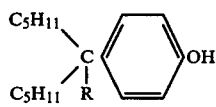

in which R is $C_9H_{19}$ to $C_{13}H_{27}$; p-cetyl-phenol; p-cumyl-phenol; phenols of the formula

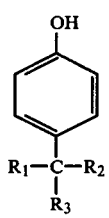

in which $R_1$ represents a straight chain hydrocarbon radical containing at least 7 carbon atoms and $R_2$ and $R_3$ represent hydrocarbon radicals the total number of carbon atoms attached to the tertiary carbon being at least 11; and phenols of the formula

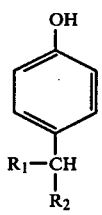

in which $R_1$ represents an alkyl hydrocarbon radical containing at least 7 carbon atoms in a straight chain and $R_2$ represents an alkyl hydrocarbon radical containing at least 2 carbon atoms, the total number of carbon atoms in $R_1$ and $R_2$ being at least 11; p-chlorophenol; p-dimethylaminomethyl-phenol; p-pentenyl-phenol; p-phenoxyphenol; p-hydroxybenzophenone; etc.

In summary, the process of the present invention is capable of preparing cyclic phenol-aldehyde resins in high yields where the phenol is substituted at least in the para-position and unsubstituted in the ortho positions. Thus the phenol may be

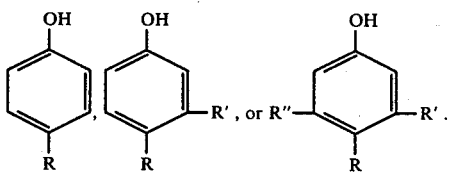

The R's may be any group that does not interfere with the reaction, such as alkyl, alkenyl, aryl, cycloalkyl, heterocyclic, alkaryl, aralkyl, halo, alkoxy, phenoxy, etc. The R's may be the same or different. The preferred species is a para-alkyl phenol. Although formaldehyde is preferred, any aldehyde that does not interfere with the reaction can be employed, for example, any aldehyde of the formula

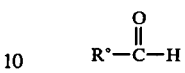

where R° is hydrogen, alkyl, aryl, cycloalkyl, alkaryl, aralkyl, heterocyclic etc.

The preformed methylol compound is

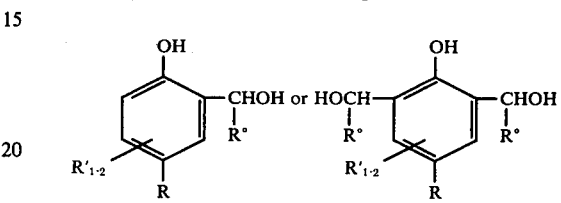

where R° is H or a substituted group.

The preformed methylol compound can be reacted alone and reacted in combination with additional phenol and aldehyde.

The reaction is carried out under any temperature capable of promoting the reaction, such as from 80° C. to the decomposition temperature of the reactants or products, such as from 80°–250° C., for example, from 100°–200° C., but preferably from 135°–185° C. Although the time of the reaction is temperature and catalyst dependent, reaction times are in general longer than those employed to prepare the corresponding linear resins, for example, from about 1–200 hours, such as from about 2 to 72 hours, but preferably from about 2 to 6 hours.

Any suitable catalyst can be employed whether strong or weak bases, such as an alkali metal hydroxide, i.e., sodium, potassium, lithium, etc., or salts thereof. The catalyst is employed in any concentration capable of promoting the reaction, such as from trace to large amount, such as from 0.001 to 10 mole percent, such as from about 0.05 to 5%, for example, from about 0.1 to 4%, but preferably from about 1.5 to 2.5%, based on phenol with an optimum of about 2.

Any non-reacting, non-polar solvent can be employed, for example, hydrocarbon solvents such as aliphatic or aromatic solvents or mixtures thereof, but preferably aromatic solvent such as xylene and trimethyl benzene or corresponding commercial solvent containing these components.

By a non-polar solvent we mean an inert solvent, i.e., a solvent that will not react with reactants or products, having low dielectric constant, that is, below about 10 (at 20° C.), preferably below about 3, especially between about 1.9 and 2.6, for example, the following solvents:

| | |
|---|---|
| benzene | 2.284 |
| cyclohexane | 2.023 |
| toluene | 2.391 |
| o-xylene | 2.568 |
| m-xylene | 2.374 |
| p-xylene | 2.270 |
| ethylbenzene | 2.412 |
| n-octane | 1.948 |
| isooctane | 1.940 |

| | |
|---|---|
| mesitylene | 2.279 |
| cumene | 2.380 |
| n-nonane | 1.972 |

Besides the use of a proper non-polar solvent, the reaction is carried out under non-polar conditions. It is desirable to avoid the presence of hydroxylic compounds such as water, alcohols, etc. Thus, paraformaldehyde is employed instead of aqueous (37%) formaldehyde.

The ratio of aldehyde to phenol should be at least stoichiometric, such as 1:1, but in practice it is desirable to employ an excess of aldehyde, such as a ratio of from 1.1:1 to 2.5:1 or higher, but preferably about 2:1.

The reaction should be carried out with adequate stirring sufficient to insure the desired reaction. An anchor type stirrer is preferred.

The cyclic resins of this invention can be employed in a variety of applications as components for resin formulations. They can also be employed as curing agents for a wide variety of resins such as polyesters, alkyds, polyesteramides, etc.

They can be reacted with various reagents such as, for example:

(1) Alkylene oxides, such as ethylene, propylene, butylene, styrene, etc., oxides, epihalohydrin, glycide, glycidyl ethers, epoxidized vinyl compounds, such as alpha-olefin epoxides, etc.

(2) Diepoxides such as $$H_2C\underset{O}{\overset{}{\diagdown\diagup}}CH-A-CH\underset{O}{\overset{}{\diagdown\diagup}}CH_2$$

where A is a bridging group, for example, alkylene, phenylene, $$-CH_2-O-\phi-C(CH_3)_2-\phi-O-CH_2-$$

$$\underset{O-CH_2-}{\overset{O-CH_2-}{\phi}}, \text{ etc.}$$

(3) Alkyleneimines, such as ethylene, propylene, etc., imine and substituted derivatives thereof.

(4) Fatty epoxides such as epoxides of high molecular weights, hydrocarbons, for example $$R-CH\underset{O}{\overset{}{\diagdown\diagup}}CH_2$$

where R has at least six carbons, epoxides of oleic acids and esters, etc.

(5)

$$H_2C\underset{O}{\overset{}{\diagdown\diagup}}CH-CH_2N\underset{R}{\overset{R}{\diagdown}}$$

where the R's are alkyl, etc.

(6) Carboxylic acids, mono-, di-, and poly-carboxylic acids, for example, acetic, proprionic, stearic, oleic, etc., acids; maleic, diglycolic, phthalic, succinic, etc., or their derivatives such as anhydrides and/or halides, to give resins, full esters, fractional esters, etc.

(7) Amines, mono- and poly-amines, to form salts, for example, alkylamines, i.e., methyl, propyl, dodecyl, etc., polyalkylenepolyamine, for example those of the formula $$H_2N(AN)_nH,$$
$$\quad\quad\quad\;\; H$$

where A is alkylene, i.e., ethylene, propylene, etc.

(8) Methylchloride, ethylchloride, etc., to yield ethers, i.e., —OR.

(9) $R_3'''SiCl$ to yield the $-OSiR_3'''$ groups.

(10) Sultones, for example, propane sultone, to yield the —O— trimethylene sulfonate derivatives.

(11) Metallic salts such as alkali metals, such as sodium, potassium, etc.

The salts, ethers, silyl ethers and sulfonates resulting from reactions 8, 9, 10 and 11, above, are characterized by the formula $$(\phi A°)_n$$

where n is 4 to 16, $\phi$ is

[three phenyl ring structures with OX substituents, and R, R', R'' substituents]

and A° is $$-\underset{R°}{\overset{H}{C}}- \quad \text{or} \quad -\underset{R°}{\overset{H}{C}}-O-\underset{R°}{\overset{H}{C}}-,$$

X being $SiR_3'''$, an alkali metal, alkyl, alkenyl, aryl, cycloalkyl, heterocyclic, alkaryl, aralkyl, or a sulfonic acid moiety, R, R', R'' and R''' being alkyl, alkenyl, aryl, cycloalkyl, heterocyclic, alkaryl, aralkyl, halo, alkoxy or phenoxy, R° being hydrogen, alkyl, aryl, cycloalkyl, alkaryl, aralkyl or heterocyclic, each $\phi$ and A° being the same or different.

The products of other of the above described reactions are claimed in Applicants' copending application Ser. No. 172,917.

These above reaction products also have a wide variety of uses as demulsifiers, emulsifiers, surfactants, detergents, corrosion inhibitors, bactericides, etc.

The following are illustrative examples of derivatives of the cyclic resins.

Preparation of the tetraacetate of cyclic octylphenol-formaldehyde tetramer

In a 500-ml round-bottom flask equipped with magnetic stirrer and reflux condenser was placed 8.73 g (0.0100 mole) of octyl cyclic tetramer, 194 ml (210 g, 2.0 moles) of acetic anhydride, and 1.0 g (0.01 mole) of 96% sulfuric acid. The mixture was stirred at reflux for 6 hours, during which time it became dark red. After cooling, filtration yielded 8.76 g, m.p. 175°–290° of crystalline material. Recrystallization from dioxane-water gave 8.29 g. (80%), m.p. 277°–282°. Another recrystallization from dioxane-water and one from chloroformheptane gave an analytical sample, m.p. 280°–283°, which was sent out for carbon-hydrogen analysis. The IR spectrum shows no hydroxyl stretching and strong carbonyl stretching at 5.67μ. The NMR spectrum shows absorption at 2.99τ, 2 protons; 6.30, 2; 8.06, 3; 8.35, 2; 8.76, 6; 9.28, 9; all singlets.

Anal: Calcd. for $C_{68}H_{96}O_8$: C, 78.42; H, 9.29; O, 12.29. Found: C, 78.63; H, 9.14.

Preparation of tetra (acidsuccinate) of cyclic octylphenolformaldehyde tetramer

In a 100-ml round-bottom flask equipped with magnetic stirrer and reflux condenser with Drierite tube were combined 4.37 g (0.00500 mole) of cyclic tetramer, 4.00 g (0.0400 mole) of succinic anhydride, and 20 ml (20 g, 0.26 mole) of pyridine. The mixture was heated at reflux for 24 hours; 1 ml (0.8 g, 0.02 mole) of absolute ethanol was added as the solution began to cool. The cold solution was transferred to a beaker, with the flask being rinsed with ethanol. Addition of 100 ml of water precipitated a white solid which was washed with a lot of water and dried to give 5.64 g (89%) of material which melts about 210°–230°. Neutralization by washing an ether solution with 5% hydrochloric acid, followed by drying and crystallization from ether-hexane gave about 3 g with nearly the same melting range and infrared spectrum (strong carbonyl absorption at 5.69 and 5.83μ) as the crude material. This half-acid ester appears not to be crystalline although it is solid.

Reaction of octyl cyclic tetramer with propane sultone

The general procedure began with dissolving the tetramer and potassium hydroxide in 100 ml of absolute ethanol. Then 3-hydroxy-1-propane-sulfonic acid sultone was added, and the solution was heated at reflux with stirring for 2 hours in a 500 ml round-bottom flask equipped with reflux condenser with Ascarite-filled drying tube. After a few minutes' heating, a white precipitate started to come out. After cooling the reaction mixture, the precipitate was filtered, washed with ethanol, and dried in an 80° oven. On standing in air these materials gained weight; the amount of weight lost by reheating was determined by thermogravimetric analysis. Sulfur analyses were done on vacuum dried samples, and calculated percentages are based on dry potassium sulfonate salts. Quantitative details are in the table below:

TABLE IV

| Ex. | Solid Product Wt. (g) | % Non-volatile | % Sulfur Calcd. | % Sulfur Found | Cyclic Tetramer | Propane Sultone | KOH |
|---|---|---|---|---|---|---|---|
| 1 | 10.12 | 96.2 | 3.1 | 2.6 | 0.01250 | 0.0125 | 0.016 |
| 2 | 13.34 | 96.3 | 5.4 | 5.4 | 0.01250 | 0.0250 | 0.030 |
| 3 | 16.55 | 95.2 | 7.1 | 6.4 | 0.01250 | 0.0375 | 0.041 |
| 4 | 20.12 | 93.8 | 8.5 | 7.5 | 0.01250 | 0.0500 | 0.051 |

In the above table, the octyl cyclic tetramer was reacted in all examples.

We claim:

1. A process of preparing an infusible, relatively organic solvent insoluble phenol-aldehyde resin having a melting point above 300° C. and containing a substantial proportion of cyclic polymer which comprises reacting a phenol substituted in the para position and unsubstituted in both ortho positions with at least one mole of an aldehyde per mole of phenol in a non-polar solvent and in the presence of a catalytic amount of a base, under mildly basic conditions at a temperature from about 80° C. to the decomposition temperature of the reactants or products, at least the final stage of the reaction being carried out under reflux with the water formed distilling off until all of said water has been removed and a phenol-aldehyde resin insoluble in the reaction medium is formed.

2. The process of claim 1, wherein the insoluble phenol-aldehyde resin formed is separated from the reaction mixture by filtration.

3. The process of claim 2, wherein the phenol is

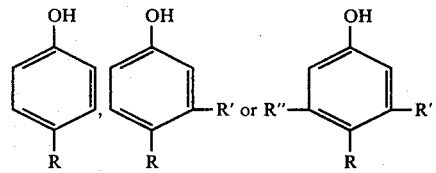

where R, R' and R" are the same or different and are each selected from the group consisting of alkyl, alkenyl, aryl, cycloalkyl, heterocyclic, alkaryl, aralkyl, halo, alkoxy and phenoxy, and the aldehyde is

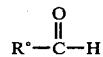

where R° is selected from the group consisting of hydrogen, alkyl, aryl, cycloalkyl, aralkyl and heterocyclic.

4. The process of claim 3, wherein the aldehyde is anhydrous.

5. The process of claim 4, wherein the aldehyde-phenol mole ratio is from about 1:1 to 2.5:1.

6. The process of claim 5, wherein the reaction is carried out at a temperature of from about 80°–250° C., said non-polar organic solvent is a hydrocarbon solvent and said catalyst is present in an amount between 0.001 and 10 mole percent, based on said phenol.

7. The process of claim 6, wherein the catalyst is an alkali metal hydroxide or basic salt thereof and is employed in an amount ranging from 1.0 to 3.0 mole percent, based on said phenol.

8. The process of claim 7, wherein the aldehyde-phenol mole ratio is about 2.

9. The process of claim 8, wherein the phenol is a para alkyl phenol, the aldehyde is formaldehyde which is introduced in the form of paraformaldehyde and excess formaldehyde distills off with the water formed.

10. The process of claim 2, wherein the reaction mixture is first heated to about 90° C., held at that temperature until it is clear and homogeneous, and then heated to reflux.

11. A process of preparing an infusible, relatively organic solvent insoluble phenol-aldehyde resin having a melting point above 300° C. and containing a substantial proportion of cyclic polymer, which comprises heating a phenol-aldehyde condensate, alone or with additional phenol or aldehyde, in a non-polar solvent and in the presence of a catalytic amount of a base, under mildly basic conditions to reflux and maintaining the reaction mixture at reflux with the water formed distilling off until all of said water has been removed and a phenol-aldehyde resin insoluble in the reaction medium is formed, said phenol-aldehyde condensate corresponding to that prepared by the condensation of a phenol substituted in the para position and unsubstituted in both ortho positions with one or two moles of an aldehyde, any additional phenol employed being also substituted as above defined, and the overall molar ratio of aldehyde moieties to phenol moieties being from about 1:1 to 2.5:1.

12. The process of claim 11, wherein said phenol-aldehyde condensate is produced in situ.

13. The process of claim 11, wherein the insoluble phenol-aldehyde resin formed is separated from the reaction mixture by filtration.

14. The process of claim 13, wherein the phenol moiety of said phenol-aldehyde condensate and said additional phenol is

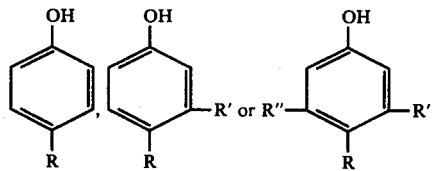

where R, R' and R" are each selected from the group consisting of alkyl, alkenyl, aryl, cycloalkyl, heterocyclic, alkaryl and phenoxy, R, R' and R" being the same or different, and the aldehyde moiety is derived from an aldehyde of the formula

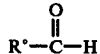

where R° is selected from the group consisting of hydrogen, alkyl, aryl, cycloalkyl, alkaryl, aralkyl and heterocyclic.

15. The process of claim 14, wherein the ratio of aldehyde derived moieties to phenol moieties is about 2.

16. The process of claim 14, wherein the phenol moiety is that of a para-alkyl phenol, the aldehyde moiety is that of formaldehyde and excess formaldehyde distills off with the water formed.

17. The process of claim 14, wherein said phenol-aldehyde condensate is selected from the group consisting of 4-t-butyl-2,6-bis (hydroxymethyl) phenol and 5-t-butyl-2-hydroxy benzyl alcohol, said additional phenol is p-t-butyl phenol, said additional aldehyde is formaldehyde and excess formaldehyde distills off with the water formed.

18. A derivative of a cyclic phenol-aldehyde resin having the formula

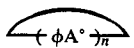

where n is 4 to 16, φ is

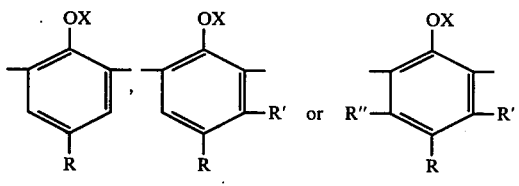

and A° is

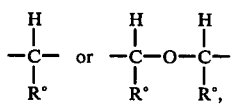

X being $SiR_3'''$, an alkali metal, alkyl, alkenyl, aryl, cycloalkyl, heterocyclic, alkaryl, aralkyl, or a sulfonic acid moiety, R, R', R" and R''' being alkyl, alkenyl, aryl, cycloalkyl, heterocyclic, alkaryl, aralkyl, halo, alkoxy or phenoxy, R° being hydrogen, alkyl, aryl, cycloalkyl, alkaryl, aralkyl or heterocyclic, each φ and A° being the same or different and R, R', R" and R''' being the same or different, said derivatives being insoluble or only slightly soluble in paraffinic hydrocarbons, ketones, esters, alcohols, water and dimethylformamide.

19. The product of claim 18, where n is 4.

* * * * *